TRANSDUCER CIRCUITS

Filed Sept. 20, 1955

INVENTOR.
George P. Maerkle
BY
Lippincott & Smith
Attorneys

United States Patent Office 2,876,420
Patented Mar. 3, 1959

2,876,420

TRANSDUCER CIRCUITS

George P. Maerkle, Huntington, N. Y., assignor to Fisher Radio Corporation, Long Island City, N. Y., a corporation of New York Application September 20, 1955, Serial No. 535,426

4 Claims. (Cl. 332—2)

This invention relates to circuits adapted to translate mechanical vibrations, representing acoustic waves, into corresponding electrical waves. The circuit of the invention is adapted for use with electro-acoustical transducers of the variable reactance type, such as condenser-microphones, condenser pick-ups as employed in phonographs, but it is also applicable to variable-inductor type pick-ups.

Among the objects of the invention are to provide a translating circuit which requires only a single pair of leads from the transducer to the translating equipment itself, to provide a circuit which yields directly a relatively high audio-frequency voltage for further amplification, this voltage being measurable in volts rather than millivolts; to provide a circuit which, still with only a single pair of leads, can be used with transducers of the balanced type which inherently cancel out certain distortions inherent in single-ended, unbalanced transducers; to provide a translating circuit which is particularly applicable for use with transistors, to take advantage of their well known low operating costs, low supply voltage, and low current-drain characteristics; and to provide a translating circuit which combines with these features, which lead to low maintenance costs, the advantages of low first cost in that the components employed are simple, few, and not intrinsically expensive.

Considered broadly, the translating circuit of this invention comprises an oscillator for converting direct current energy into oscillating energy. The oscillator employed may be of either the vacuum tube or the transistor type. It should operate at a substantially fixed frequency, and to this end employs a frequency-determining tank circuit, anti-resonant at the frequency of oscillation, for example, as in the well known Hartley or Colpitts oscillators. Coupled to the oscillator tank circuit is loading circuit which preferably is approximately matched in impedance with the tank circuit. The loading circuit comprises at least one series circuit which includes a variable-reactance transducer and an additional impedance element having a different phase characteristic from the transducer; preferably a reactance of opposite sign from that of the transducer, although it may be resistive. In any event, the series circuit as a whole offers minimum impedance at a frequency spaced from the operating frequency of the oscillator. The loading circuit may include two series circuits in parallel, in which case the individual frequencies of minimum impedance are spaced on opposite sides of the oscillator frequency, a transducer of the balanced type forming the variable-reactance elements of both series circuits. In practice the transducer will usually be of the capacitive type, but variable inductance transducers can also be employed if desired. The useful output voltage is taken across a load impedance, preferably a pure resistance, connected in the direct current supply to the oscillator.

The above will be better understood by reference to the detailed description of various modifications of the invention which follows, as illustrated in the accompanying drawings, wherein.

Figure 1:
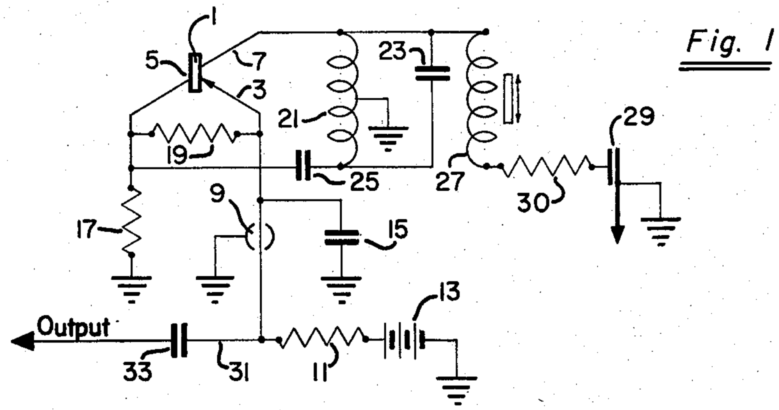
Fig. 1 is a schematic drawing of the simplest embodiment of the invention, employing an unbalanced load circuit for the oscillator with a single-sided, capacity-type transducer.

Considering first the elementary or simplest form of the invention illustrated in Fig. 1, the circuit employs a transistor 1 of the junction type having an emitter 3, base 5 and collector 7. The emitter connects through a shielded lead 9, a load resistor 11 and a direct current source 13 to ground, with a radio-frequency by-pass condenser 15 connecting to ground directly from the emitter. The base 5 also connects to ground through a biasing resistor 17, biasing current being supplied through another resistor 19 connecting from the emitter to the base. The frequency-determining parallel-resonant tank circuit comprises an inductor 21 and capacitor 23 in parallel. These connect from the collector lead back to the base 5 of the transistor through a blocking condenser 25, a tap on the inductor 21 being grounded.

This circuit will be recognized as the direct analog of the Hartley circuit as used in vacuum tube oscillators. The emitter, corresponding to the cathode of a triode, is effectively grounded to oscillatory currents through the by-pass condenser 15. The base, being the analog of the control grid of a triode, connects to one side of the tank circuit; the collector, corresponding to the plate of a triode, connects to the other side of the circuit so that collector and base swing in opposite phase relative to ground, to provide the feedback which results in oscillation.

An oscillator loading circuit is coupled effectively in parallel with the tank circuit of the oscillator. As shown in Fig. 1 the load circuit is direct-coupled and comprises an inductor 27 in series with a condenser transducer 29. The inductor is shown as variable, but normally its adjustment is not changed after it has once been adjusted. Conveniently it is of the "slug-tuned" type, which uses a core of ferrite or other low-loss, ferro-magnetic material to vary the effective inductance. The transducer may be any of the various types of condenser pick-up, such as a condenser microphone or phonograph pick-up, the latter being illustrated.

The frequency of operation of this arrangement can vary over a wide range. Illustrative of constants which have proved satisfactory, the oscillator has been operated at the fixed frequency of approximately six megacycles; the normal or mean capacity of the transducer may be considered, illustratively, at about 5 mmf. with a maximum variation of about 0.5 when the pick-up is in operation, although it may be less, in which case a higher operating frequency would be used. The inductor is adjusted so that normally, when the pick up needle is in its mean position, the load circuit is series-resonant at from one-half to one megacycle off of the operating frequency of the oscillator, i. e., the series resonant circuit is tuned either to somewhere between 5.00 and 5.50 megacycles or between 6.5 and 7.0 megacycles. In the first case the reactance of the series circuit is inductive at the oscillator frequency and the transducer neutralizes a varying portion of the inductance; if tuned above the oscillator frequency the reactance is capacitive, and a portion of the variable reactance is neutralized by the series inductance. The individual reactances of the elements of the series circuit will normally be high in comparison with those of the elements in the tank circuit. The normal capacity of the transducer, with its movable plate in its undeflected or mean position may be of the order of one-tenth that of condenser 23, and its reactance ten times as high. The reactance of the inductor 27 will lie in the same general range; higher or lower, as the case may be. Because of the voltage step-down effected by the coupling between the tank and load circuits (assuming, illustratively, that the center point of the inductor 21 is connected to ground) the effective value of the impedance of the load circuit, as reflected in the tank circuit, will be increased by the square of the step-down ratio; a factor of about 4. Viewed from the tank circuit the load circuit, because it is detuned with respect to the oscillator frequency, looks like either a large inductance or a small capacity in parallel with the tank circuit, either raising or lowering its resonant frequency slightly.

The inductor 27 has, inherently, a small resistance, as indicated schematically at 30. Experiment has shown that the inductor may have a Q of from 75 to 100, the effective value of the resistance 30 therefore being a few ohms—say 50 to 100—including the apparent resistance introduced by the core loss.

As the series circuit is tuned nearer and nearer to the oscillator frequency its impedance drops and its admittance rises, being equal to $$\frac{R}{R^2+X^2}+\frac{jX}{R^2+X^2}$$

Only the first (conductance) term need be considered here; it represents a conductance in parallel with the tank circuit, and with the values here suggested it will be so large in comparison with that of the tank circuit that it may be taken as the entire load on the oscillator. In terms of impedance, the tank and load circuits together look like a resistance of $$\frac{R^2+X^2}{R}$$

ohms.

At series resonance this reduces to R, effectively a short circuit. Where R is small in comparison with X the effective resistance approaches very nearly $$\frac{X^2}{R}$$

If, in turn, the variation ΔX is only a few percent $(X+\Delta X)^2$ is very nearly $X^2+2\Delta X$. With even as much as a ten percent variation in X the distortion is only approximately 2.5%. The load on the oscillator can be adjusted from R to a very high value, depending on the degree of detuning; the closer the tuning the greater will be the variation in effective load for a given displacement of the transducer plate, the greater the variation in oscillator frequency and the greater the non-linearity. The values given maintain the oscillator frequency substantially fixed and excellent linearity, but with different compounds quite different values might be chosen.

The variation in the load drawn from the oscillator is reflected in the direct current which it demands. If the resistance of the load upon the oscillator increases the apparent resistance of the oscillator circuit as viewed from the source 13 rises, the current accordingly falls and so does the voltage across the load resistor 11; as the frequency of the series circuit approaches more nearly that of the oscillator the apparent direct current resistance falls and the resultant increase in current is reflected by an increased voltage drop across the load resistor 11. With a 3300-ohm resistor an effective audio frequency voltage of about one-half volt is effective between the lead 31 and ground. A blocking condenser 33 is shown in this lead, but this can be omitted if the resistance of the output circuit is high in comparison with the impedance of the translating circuit as viewed from the source 13.

Figure 2:
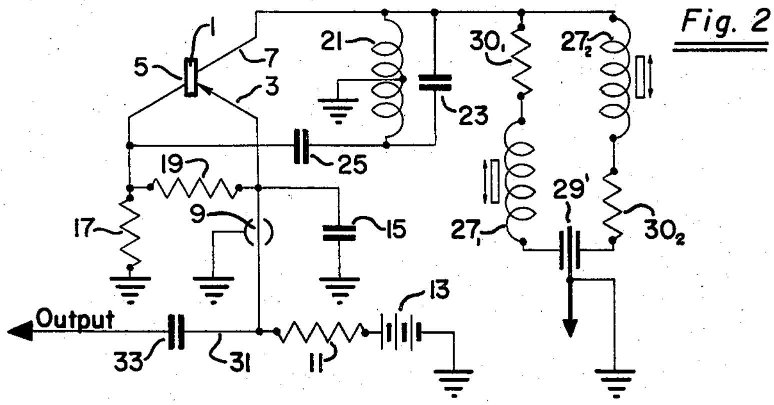
Fig. 2 is a similar schematic diagram showing a condenser-type balanced transducer pick-up.

The circuit shown in Fig. 2 is essentially the same as that of Fig. 1 with the exception of the oscillator load or transducer circuit, and the various elements are therefore identified by the same reference characters up to and including the parallel resonant tank circuit. In the load circuit, however, a balanced transducer 29' is used, where in operation a central plate approaches a fixed plate on one side and recedes from a second fixed plate on the opposite side in response to vibration, increasing one capacity and decreasing the other and thus changing the reactance of the two halves in opposite directions. In this form of the device two series circuits, comprising inductors $27_1$ and $27_2$, are connected in parallel. The two inductors are preferably as nearly identical as possible. The two sides of the condenser-transducer are preferably also identical, and the capacity of each to the central plate is the same as in the single-sided device of Fig. 1, or about 5 mmf. The two inductors are detuned by equal amounts ΔL from the inductance L which would bring the respective sides of the circuit to series resonance with the oscillator frequency, so that the indutcance $27_1$, say, would be $L+\Delta L$, while that of $27_2$ would be $L-\Delta L$. Accordingly, the series resonant circuits, in parallel, form, in effect, a parallel resonant circuit which is tuned to the same frequency as the tank circuit.

The effect of this arrangement is to cut the apparent load resistance on the oscillator in half, for a given amount of detuning. The percentage change in load, for a given transducer plate deflection, remains the same, and the same factors affect the residual non-linearities to the same degree. The circuit, however, has two advantages: the load is varied without even the small frequency variation involved in the arrangement of Fig. 1, and any non-linearities in the transducer are almost completely cancelled out.

The two halves of the transducer represent two condensers in series. The position of the movable plate has substantially no effect on the net series capacity of the combination, edge-effects of a single plate condenser effectively disappearing. The effective capacity of either side varies inversely with the separation of the plates, but as the reactance varies inversely with the capacity the net variation in the reactance of each side is linear and the circuit as a whole remains in resonance.

Figure 3:
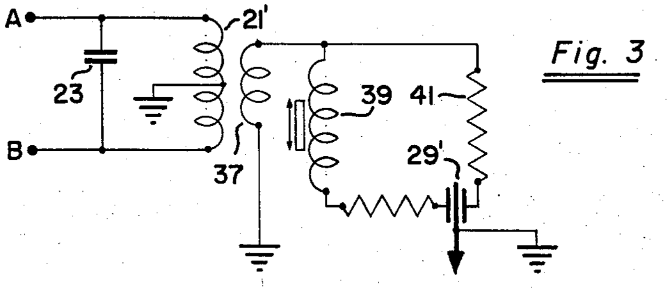
Fig. 3 is a schematic diagram illustrating a slightly different form of oscillator load circuit using a balanced transducer.

In Fig. 3 a further modification of the invention is shown. In this figure the active element of the oscillator is omitted, since its showing would be merely repetitious. The parallel-resonant tank circuit shown replaces that of Fig. 2, connecting to the transistor (or tube) at the terminals A and B. The load circuit is shown as being inductively coupled instead of directly coupled to the tank circuit. The coupling to the load is through an inductor 37, one end of which is grounded while the other end connects to the load circuit which includes the transducer. As in the circuit of Fig. 2, the load comprises two branch circuits in parallel; one branch comprises an inductor 39, the value of which, as adjusted by its tuning slug, is 2L, where L is the value of inductance which would be series-resonant with one-half of the capacity-type transducer 29'. Accordingly, the circuit as a whole has its maximum response at the oscillator frequency, as the capacity of the two halves in series is one-half of that of one side alone. Preferably a resistor 41 is connected in series with the other half of the transducer, the value of this resistor being substantially equal to the effective resistance of the inductor 39, although this is not necessary and the resistor may be omitted if desired. As in the case of the circuit shown in Fig. 2, the two parallel branches together form a resonant circuit offering a purely resistive impedance at oscillator frequency. With this arrangement the branch circuit will be series-resonant at a frequency of about 71% of that of the oscillator, or at substantially 4.25 megacycles if the oscillator is tuned to 6 megacycles. The branch containing capacity alone or, as shown, capacity and resistance, would be "series resonant" at a frequency approaching infinity, since the only inductance included is that of leads and the resistor itself. If the resistor is omitted there is a very slight change in the resonant frequency of the circuit with variation in position of the central plate of the pick-up, but this is even smaller than in the circuit of Fig. 1, which is why the resistor 41 can be omitted without material effect except that its presence cuts the apparent impedance of the load circuit in half. This arrangement is shown as illustrating one limit of the departure of the tuning of a single one of the two series-resonant branches from the frequency of the oscillator; with this arrangement $\Delta L$ is equal to L. It gives maximum impedance to the load circuit as viewed from the oscillator. The impedance can be matched to the oscillator impedance, to give best results and greatest variation in output, by varying the turn-ratio of the coils 21′ and 37.

It may be noted that the reactance-resistance combination may be used alone with an unbalanced transducer, and coupling step-up or down employed to obtain the desired effective load impedance. The use of the inductance-capacity arrangement gives more flexibility, however, which is the reason for preferring it, particularly as resistance of about the right order of magnitude is inherent in any inductor which can be realized in practice.

Figure 4:
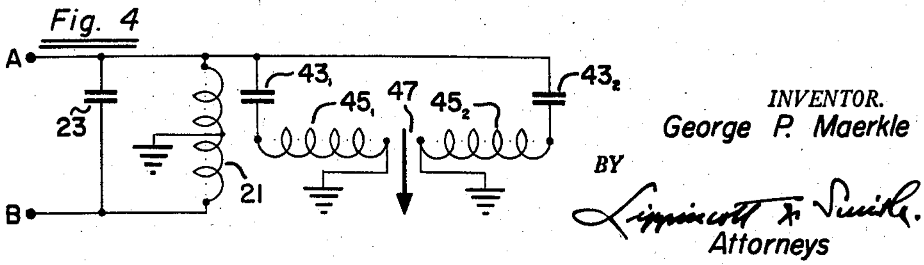
Fig. 4 shows another modified type of oscillator load or transducer circuit.

Fig. 4, like Fig. 3, shows merely the tank circuit and the load circuit. The load circuit comprises a variable-inductance transducer instead of the variable-capacity type illustrated in the other figures. Each of the two branch circuits includes a series condenser $43_1$, $43_2$ and an inductor $45_1$ and $45_2$, the latter being the two halves of a variable inductance, balanced transducer. The difference in the two branch circuits lies in the relative capacities of the two condensers $43_1$ and $43_2$, which are are chosen to be series-resonant at frequencies respectively above and below the oscillator frequency when connected in series with the mean inductance of the coils $45_1$ and $45_2$ respectively. In operation the effective inductance of the coils is changed by changes in the position of a magnetic vane 47 of the pick-up. As in the case of the circuit shown in Fig. 3, one of the reactive elements in one of the two parallel branches may be omitted, in this case, for example, one of the two condensers $43_1$ and $43_2$. The circuit branch comprising pure inductance would then be "series resonant" at zero frequency, the condenser remaining in the circuit having one-half of the capacity required for resonance to either branch alone and the branch containing it being resonant at a frequency substantially 41% higher than the oscillator frequency. Variable-inductance type transducers are not, generally, as satisfactory as the variable-capacity types of pick-up, and this arrangement is shown primarily for the sake of completeness and to indicate the generality of the invention.

As a practical matter, one of the greatest advantages of the present invention is that the connection from the coupling of the oscillator circuit to the pick-up can be by a single pair of leads, one of which can be grounded, as, for example, a single coaxial cable instead of by a multi-conductor cable, as is required with many types of pick-up. For most prior types of balanced pick-up an additional conductor is needed to the central plate, as well as various auxiliary connections, and this leads to both expense and complications. Furthermore, if the circuit here disclosed is used as a preamplifier with the power amplifier located at a distant point, the output leads also can comprise a single coaxial cable with a grounded outer conductor.

Although as has been stated, the active element of the oscillator may be a vacuum tube instead of the transistor that has been described, one of the advantages of using the latter is that it is a relatively low-voltage, low-impedance device. The series-tuned circuits which have been shown lead naturally to relatively low impedances, which can easily be adjusted to match the impedance of a coaxial cable. For such condition, the pick-up can be spaced, if desired, from the oscillator. With impedances thus substantially matched, the attenuation in them is relatively so small that from the oscillator tank circuit they appear as small series resistors if they are of any length which would be normally required for the duty for which the apparatus is designed. Furthermore, with the transistor, the entire D.-C. supply can be through the same lead as that from which the output voltage is taken. Using vacuum tube techniques the effective mismatch will, in general, be greater, although it is not difficult to overcome by using inductively coupled circuits, as shown in Fig. 3, or by tapping in the load circuit at a selected point on the inductor, if direct instead of inductive coupling is desired, but additional leads are required.

Another advantage of the circuit is that it is completely self-rectifying, so that no additional detector is required. A third advantage, from the operating point of view, is the high gain attained with a single amplifier, despite the very minute capacity of the condenser type pickups used and the still smaller changes in those capacities.

As has been shown, both the balanced and the unbalanced circuits may be made as nearly linear as desired. The percent of non-linearity in the circuit is approximately equal to one-half of the percentage variation in impedance when R is small in comparison to $jX$. At times it may be advantageous to introduce a controlled amount of non-linearity, to compensate a non-linearity of opposite sign in other parts of the circuit. For example, with an unbalanced transducer, the capacity may vary more rapidly than in inverse proportion to the separation of the plates, in which case, if the series circuit is inductive the change in reactance is most rapid as the resonant frequency departs from the oscillator frequency. This results in a non-linearity in the opposite sense to that inherent in the load circuit when the reactance is low. The result can be substantially complete linearity, with higher sensitivity as a secondary and beneficial effect.

Because of its simplicity and the high degree of linearity that can be achieved with the unbalanced circuit it is at the present time the preferred form of the invention for general use. Each of the forms shown has its advantages in specific applications, however, and other possible modifications will be apparent to those skilled in the art. The illustrative examples given herein are therefore not intended as limitations, all intended limitations being set forth in the claims which follow.

What is claimed is:

1. A signal-translating circuit comprising an oscillator for converting direct-current energy to oscillating energy of substantially constant frequency, a pair of series resonant circuits connected in parallel and coupled to load said oscillator, said series-resonant circuits comprising respectively inductors of unequal magnitude each connected to one side of a balanced capacity-type transducer and the parallel circuit formed by said series-resonant circuits being parallel resonant to substantially the frequency of said oscillator, a circuit for supplying direct current energy to said oscillator and a load resistor connected in said last-mentioned circuit.

2. A signal translating circuit comprising an oscillator for converting direct current energy to oscillating energy of substantially fixed frequency, a series circuit including a transducer of the variable reactance type, and a resistor defining an impedance element of different characteristic phase-angle type coupled to load said oscillator and having minimum impedance at a frequency spaced from said frequency, a circuit for supplying direct-current energy to said oscillator, and a load resistor included in said last-mentioned circuit.

3. A signal translating circuit comprising an oscillator for converting direct current energy to oscillating energy to substantially fixed frequency, a series circuit including a transducer of the variable reactance type and an impedance element of different characteristic phase-angle type coupled to load said oscillator and having minimum impedance at a frequency spaced from said fixed frequency, a circuit for supplying direct-current energy to said oscillator, a load resistor included in said last-mentioned circuit, a second circuit also connected to load said oscillator and having a minimum impedance at a frequency spaced from the fixed frequency in the opposite sense from said series circuit.

4. A translating circuit as defined in claim 3 wherein the variable-reactance transducer is of the balanced type comprising two substantially equal reactance elements varying in opposite senses, one of said reactance elements being included in said series circuit and the other in said second circuit.

References Cited in the file of this patent

UNITED STATES PATENTS

| | | |
|---|---|---|
| 2,443,125 | Weathers | June 8, 1948 |
| 2,532,060 | Dicke | Nov. 28, 1950 |
| 2,615,960 | Erwin | Oct. 28, 1952 |

FOREIGN PATENTS

| | | |
|---|---|---|
| 295,957 | Great Britain | Aug. 17, 1928 |